No. 799,385. PATENTED SEPT. 12, 1905.
J. JAEGER.
MACHINE FOR MAKING ARTIFICIAL STONE BLOCKS.
APPLICATION FILED FEB. 13, 1905.
7 SHEETS—SHEET 1.
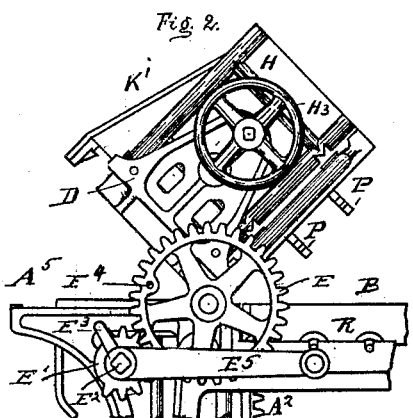
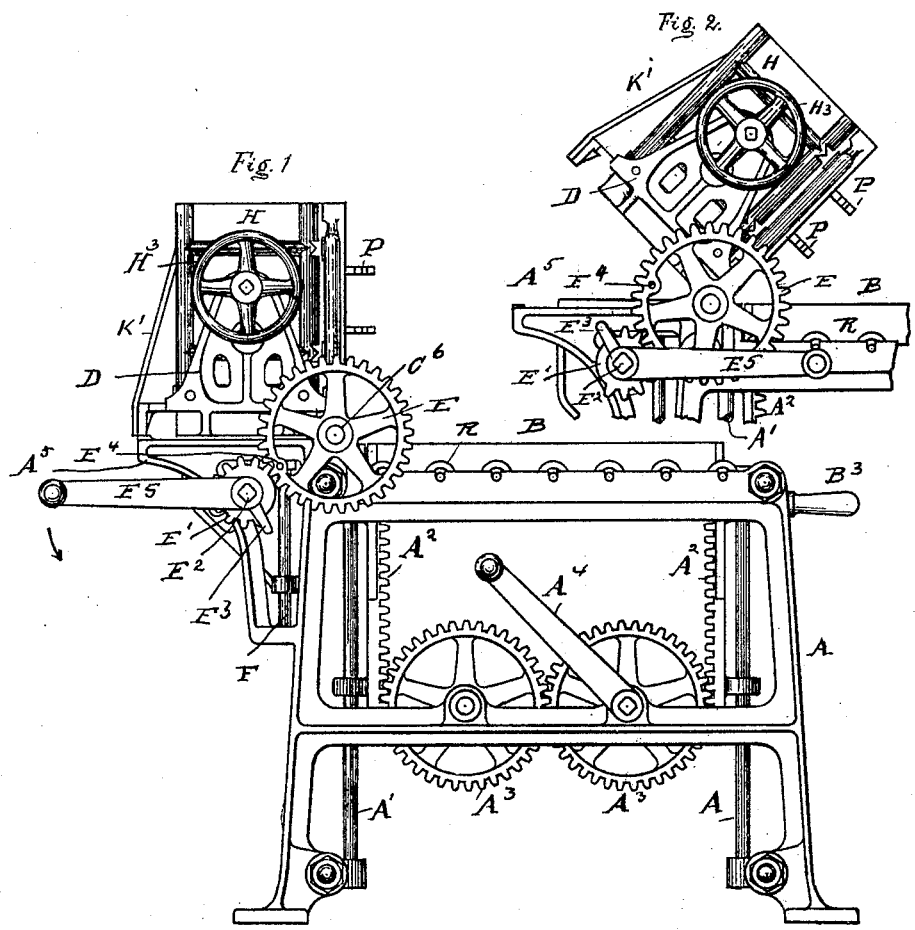
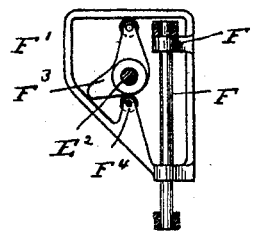
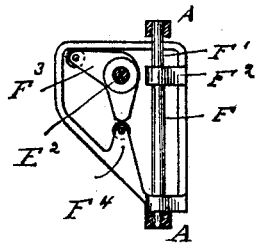
WITNESSES:
INVENTOR
Julius Jaeger No. 799,385. PATENTED SEPT. 12, 1905.
J. JAEGER.
MACHINE FOR MAKING ARTIFICIAL STONE BLOCKS.
APPLICATION FILED FEB. 13, 1905.

7 SHEETS—SHEET 2.

No. 799,385. PATENTED SEPT. 12, 1905.
J. JAEGER.
MACHINE FOR MAKING ARTIFICIAL STONE BLOCKS.
APPLICATION FILED FEB. 13, 1905.
7 SHEETS—SHEET 3.
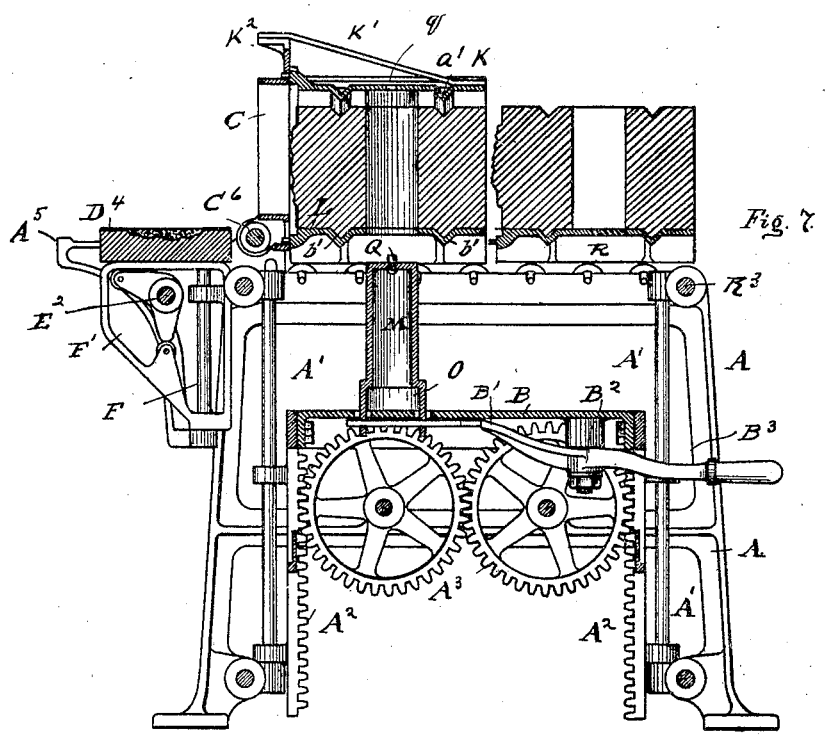
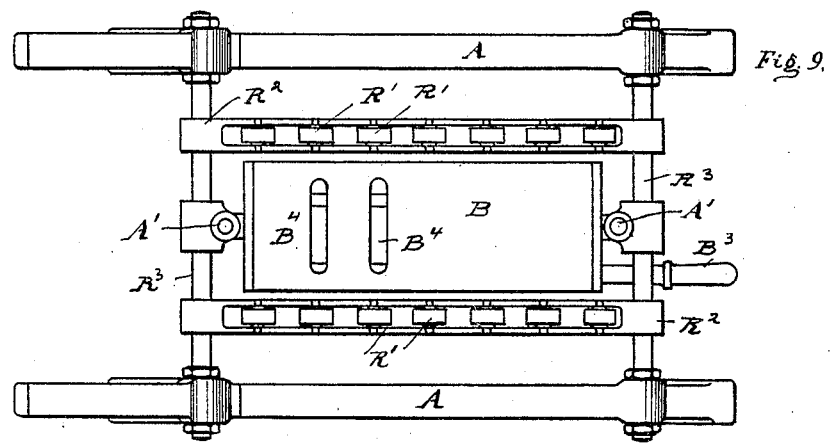
WITNESSES: INVENTOR

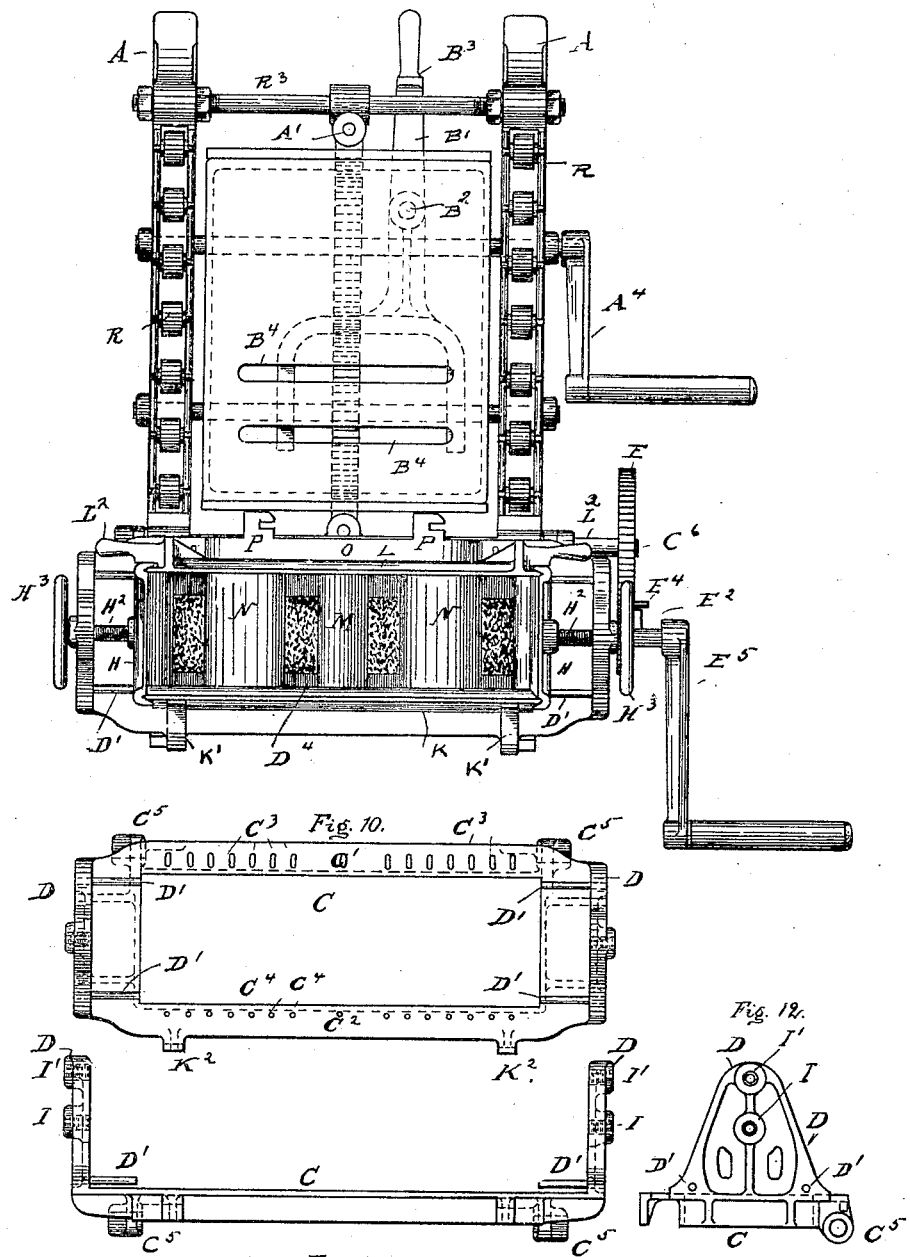

No. 799,385. PATENTED SEPT. 12, 1905.
J. JAEGER.
MACHINE FOR MAKING ARTIFICIAL STONE BLOCKS.
APPLICATION FILED FEB. 13, 1905.
7 SHEETS—SHEET 5.
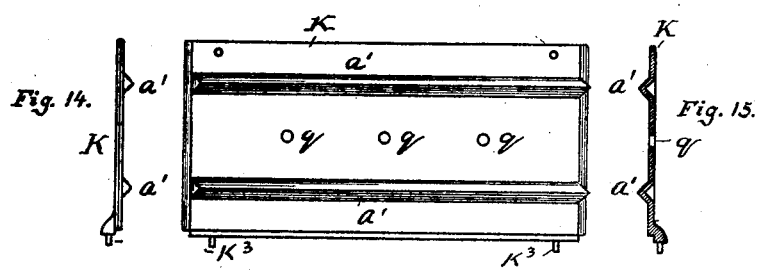
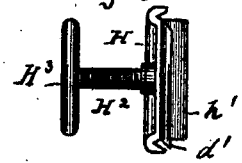
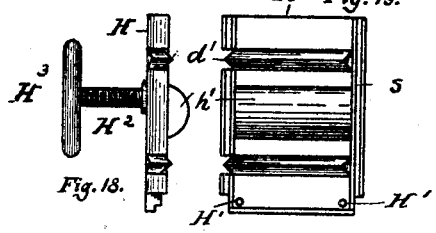
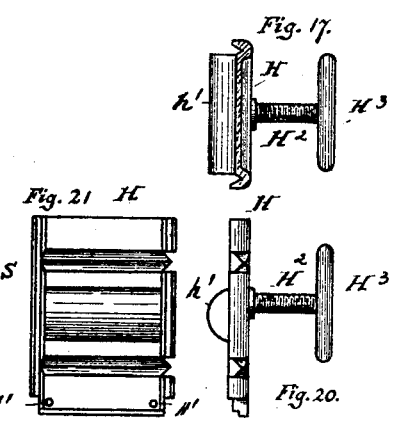
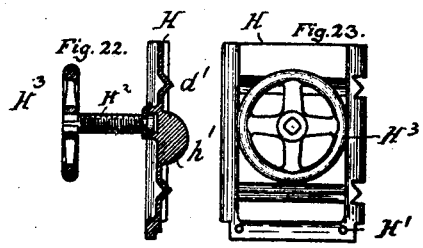
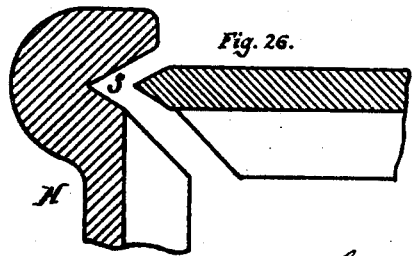
WITNESSES:
INVENTOR:
Julius Jaeger No. 799,385. PATENTED SEPT. 12, 1905.
J. JAEGER.
MACHINE FOR MAKING ARTIFICIAL STONE BLOCKS.
APPLICATION FILED FEB. 13, 1905.
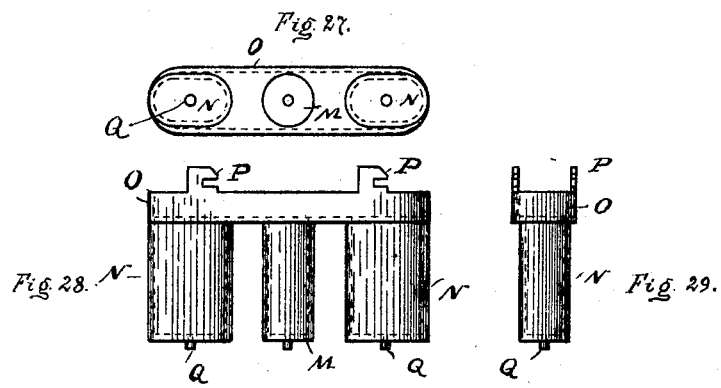
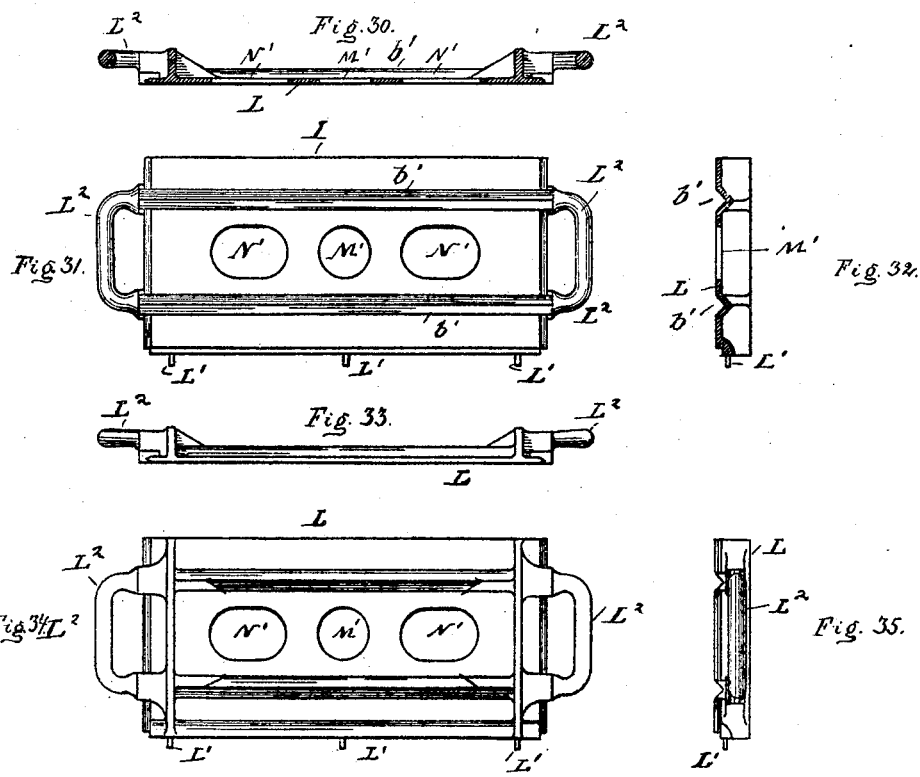

No. 799,385. PATENTED SEPT. 12, 1905.
J. JAEGER.
MACHINE FOR MAKING ARTIFICIAL STONE BLOCKS.
APPLICATION FILED FEB. 13, 1905.
7 SHEETS—SHEET 7.
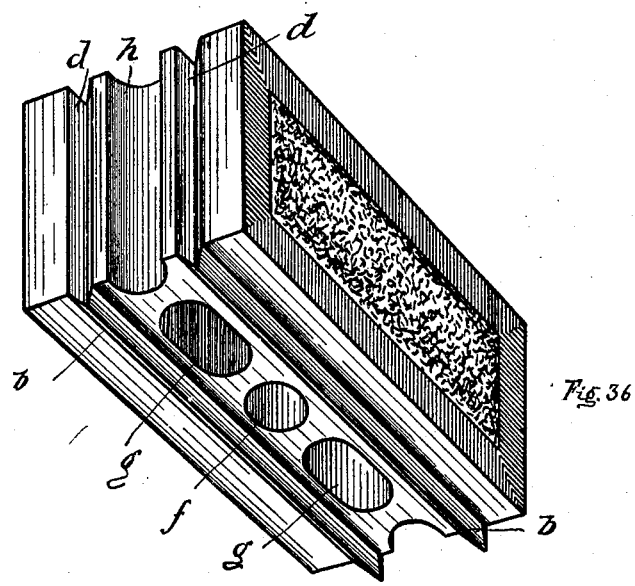
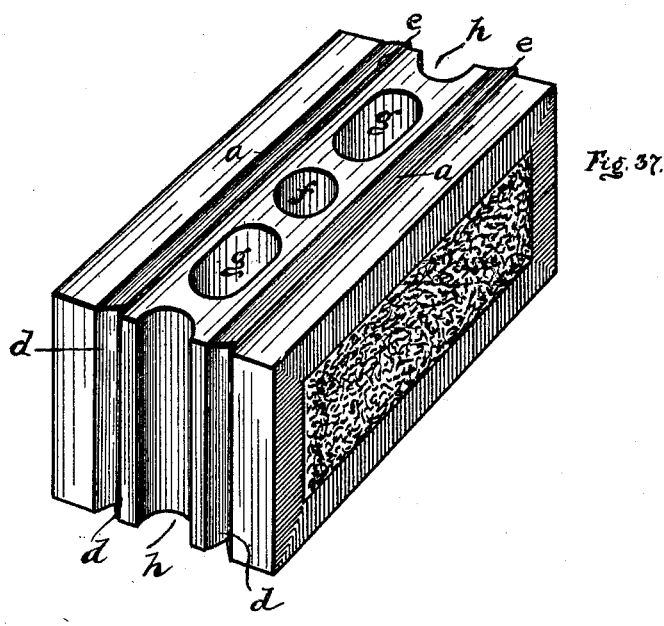

UNITED STATES PATENT OFFICE.

JULIUS JAEGER, OF RUTHERFORD, NEW JERSEY.

MACHINE FOR MAKING ARTIFICIAL-STONE BLOCKS.

No. 799,385.   Specification of Letters Patent.   Patented Sept. 12, 1905.

Application filed February 13, 1905. Serial No. 245,406.

*To all whom it may concern:*

Be it known that I, JULIUS JAEGER, a citizen of the United States, residing at Rutherford, Bergen county, New Jersey, have invented certain new and useful Improvements in Machines for Making Artificial - Stone Blocks, of which the following is a specification.

This invention relates to improvements in machines for making artificial-stone blocks; and the object of my invention is to provide a new and improved machine of this kind which is simple in construction, molds the blocks rapidly, permits of providing the blocks with a strong and durable face of any desired design or composition different from the balance of the block, and which machine is so constructed that the block can be removed from the mold very easily and rapidly without in any way jarring, damaging, or disfiguring the block.

Figure 5:
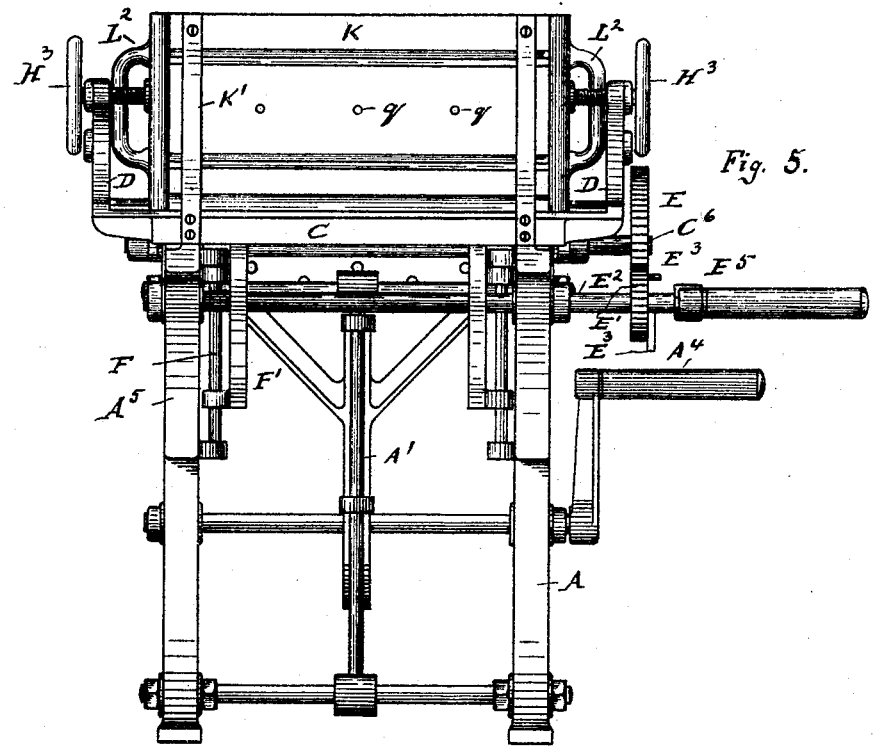
Figure 6:
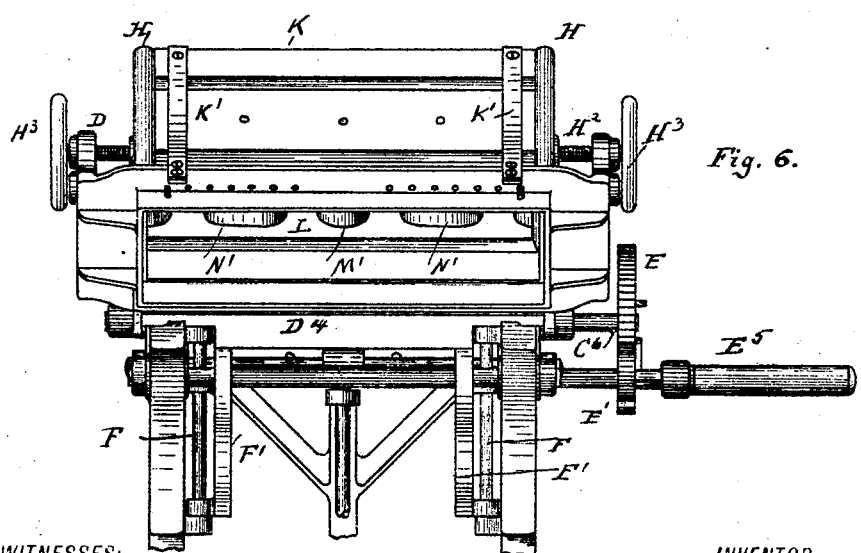

In the accompanying drawings, in which like letters of reference indicate like parts in all the figures, Figure 1 is a side elevation of my improved machine for making artificial-stone blocks with the parts in the position which they have when the material is being tamped into the mold. Fig. 2 is a side view of part of the machine, showing the mold half-tilted. Figs. 3 and 4 are detail elevations of parts partly in section and showing means for lowering the pattern-plate for making the front face of the block. Fig. 5 is a front elevation of the machine with the parts in the same position as shown in Fig. 1. Fig. 6 is a front elevation of the upper part of the machine with the parts in the position in Fig. 2. Fig. 7 is a vertical longitudinal sectional view of the machine. Fig. 8 is a plan view of the same. Fig. 9 is a plan view showing a slight modification. Fig. 10 is a plan view of the base of the mold-box with its end pieces. Fig. 11 is a side view of the same. Fig. 12 is an end view of the same. Fig. 13 is an inside perspective view of the fixed side wall of the mold-box. Fig. 14 is an end elevation of the same. Fig. 15 is a transverse vertical sectional view of the same. Fig. 16 is a plan view of one movable end piece of the box. Fig. 17 is a horizontal sectional view of the other end. Fig. 18 is a vertical edge view of one of the movable ends of the box. Fig. 19 is an inside elevation of the same. Fig. 20 is a vertical edge view of the other movable end of the box. Fig. 21 is an inside elevation of the same. Fig. 22 is a vertical sectional view of the movable end of the box. Fig. 23 is an outside elevation of the same. Fig. 24 is a vertical sectional view of the movable end. Fig. 25 is an outside elevation of the same. Fig. 26 is a detail sectional view showing how the corners of the end and side walls of the box meet. Fig. 27 is a face view of the cores. Fig. 28 is a side view. Fig. 29 is an end view. Fig. 30 is a longitudinal sectional view of the removable side wall of the box. Fig. 31 is a plan view of the inside of the same. Fig. 32 is a vertical transverse sectional view. Fig. 33 is a side edge view. Fig. 34 is a plan view of the outside of the same. Fig. 35 is an end view of the same. Fig. 36 is a perspective view of the improved ornamental stone block made on my improved machine viewed from the end, front, and below. Fig. 37 is a similar view viewed from the end, the front, and above.

The entire machine rests on and is built in a frame A, preferably made of cast metal and having in general the shape and construction of a table-frame. This frame supports two upright guides A', one at each end of the frame, and on each upright a rack-bar $A^2$ is guided to move vertically, preferably by means of an eye, which racks at their upper end are united by a table B, Fig. 7, mounted and located between the sides of the frame A. The racks $A^2$ are engaged by the two engaging cog-wheels $A^3$, mounted on suitable cross-shafts on the frame A, one of which cross-shafts is provided with a crank-handle $A^4$ or analogous means for turning the cog-wheels $A^3$ in one direction or the other, and thereby raising or lowering the table B. A latch-lever B' is pivoted at $B^2$ to the under side of the table and is provided with a handle $B^3$, projecting beyond the table. The inner end of this lever is forked, and the shanks of the fork extend across two parallel slots $B^4$, Fig. 9, in the table B, for a purpose that will appear hereinafter.

The mold-box is constructed with a base-frame C, Fig. 10, having two flat side bars C' $C^2$, the former being provided with a series of transverse slots $C^3$ and the latter with a series of corresponding holes $C^4$. The slots and holes are arranged in groups at each side of the center, the individual slots and holes being equal distances from each other. This base-frame is provided with rigid end pieces D, at right angles to the base, and from each end piece guide-pins D' extend inward at the bottom of the end piece, as shown in Figs. 10, 11, and 12, for a purpose that will appear later on.

The base C is provided with two eyes $C^5$, through which a shaft $C^6$, Fig. 7, passes, which is mounted to turn in suitable bearings on the main frame A, these eyes being secured or bolted to the shaft, so that when the shaft is turned axially the mold will swing with said shaft as a pivot—as, for example, illustrated in Fig. 2. A cog-wheel E is fixed on one end of this shaft $C^6$ and engages a mutilated pinion E', fixed on a shaft $E^2$, also mounted in the frame and provided with a crank-handle $E^5$ for turning it. The pinion E' carries a tappet or finger $E^3$, which can contact with a pin $E^4$, projecting from the wheel E at the rim thereof. The mold-base C when in the position of rest rests on brackets $A^5$, Fig. 2, at one end of the frame A, and at the inner sides of said brackets two vertical guide-rods F are located on short brackets extending inwardly from the sides of the frame A, and on each guide-rod F a support F' is mounted to slide vertically, each support having guide-eyes $F^2$, which embrace the guide-rods F, as appears in Figs. 3 and 4. On the shaft $E^2$ a double-armed cam $F^3$ is fixed within each movable support F', one arm of said cam being adapted to act upon the top of a movable support F' and the other upon a cam projection $F^4$ of said movable support, so that by means of said cams the supports F' can be raised or permitted to descend. The bottom part of the mold—that is to say, that part on the inner surface of which the ornamental face of the stone block is to be molded, and which will be referred to as the "pattern-plate"—rests and is secured upon the supports F' and is of such size as to fit in the opening in the base C of the mold-box, this pattern-plate being designated by the letter $D^4$. This pattern-plate can thus move up and down independently of the mold-box.

Before describing the balance of the machine it will be advisable to note the features of the block to be made on the machine and which is represented in Figs. 36 and 37. As appears from these figures, the stone block has an ornament—for example, in imitation of cut stone, ashler, or any other desired pattern. The top of the block is provided with two longitudinal V-shaped grooves $a$ and the under side with two corresponding V-shaped ridges $b$, which when one block is placed upon another block pass into the corresponding grooves $a$ of the block below. One end of the stone is provided with V-shaped vertical grooves $d$ and the other end with vertical V-shaped ridges $e$. The block is also provided with three or more holes extending from top to bottom—the center hole $f$, which is preferably circular, and two end holes $g$, which are preferably oblong with rounded ends—and in addition thereto each end is provided with a semicircular vertical recess $h$. Therefore in order to make a block such as described the bottom of the mold must consist of the pattern-plate. One longitudinal side of the mold must have ridges $a'$ for forming the grooves $a$ and the other longitudinal sides must have grooves $b'$ for forming the V-shaped ridges $b$. One end must have ridges $d'$ for forming the end grooves $d$ and the other end must have grooves $e'$ for forming the end ridges $e$, and both ends must also be provided with half-cores $h'$ for forming the recesses $h$. The openings $g$ and $f$ are formed by cores. I will first describe the mold-box ends, which are shown in Figs. 16 to 25. These ends or plates H are provided at the bottom with holes H' for receiving the guide-pins D' on the fixed ends D of the base C, so as to permit of making blocks of greater or less lengths. A screw $H^2$, having a hand-wheel $H^3$ on its outer end, is mounted to turn in a suitable socket in the outer face of each end H, and this screw is mounted to turn in a nut I or I' in the fixed end D of the base C, according to the thickness of the block. The end H for one end of the stone is provided, as stated, with vertical V-shaped ridges $d'$ for forming the grooves $d$ and the other end plate is provided with vertical V-shaped grooves $e'$ for forming the vertical ridges.

The side plate K, Fig. 13, has pins $K^3$ at its bottom edge which pass into the holes $C^4$ of the base C for the purpose of holding the plate in proper position on the base. This side plate is also held in place by braces K', Figs. 1 and 8, which are secured to lugs $K^2$ on the base C and to the top edges of this side plate K. The opposite side plate L is shown in Figs. 30 to 35 and is provided with two longitudinal grooves $b'$ for forming longitudinal ridges $b$ in the block. This plate L is provided in its bottom edge with pins L', which pass into the slots $C^3$, Fig. 10, for the purpose of holding the plate in proper position and for permitting movements of the same transversely to the width of the block. This longitudinal plate L also is provided with end handles $L^2$ for carrying away the completed block and is provided with a central circular hole M' and two oblong holes N' with rounded ends for receiving the cores M and N, which project from a core-plate O, having holes P at both edges. From the free end of each core M and N a stud or pin Q projects, which studs or pins Q can pass into the holes $q$ of the plate K for the purpose of properly centering the cores. Each end plate H is also provided along its end edges with vertical grooves S, which are substantially V-shaped for receiving the corresponding V-shaped ends of the longitudinal plates, as shown clearly in Fig. 26, so as to cause an exact tight and close fit at the corners of the mold-box and to get them square and true. On the top of the frame A a series of rollers R are mounted along each side, as shown in Fig. 8. Instead of mounting these rollers at the side edges of the supporting-frame rollers R' may be mounted in separate supporting-pieces R², supported on the cross-bars R³, which unite the two side sections of the frame, as shown in Fig. 9.

The operation is as follows: When beginning to make the block, the parts are in the position shown in Fig. 1 and the pattern-plate D⁴ is in raised position—that is, its supports F' are in the position shown in Fig. 3. This pattern-plate is within the opening in the base C of the mold-base. The design-face of the stone, such as ashler or like design, is usually made of better composition than the balance of the block and is preferably made of a mixture of high-grade cement or sand or, in fact, any suitable substance. This mixture for making the face of the stone is first placed into the mold to a depth of half an inch or an inch (more or less) or may even be made of greater thickness. This material for making the face of the block can thus be carefully tamped and pressed into the recess of the pattern-plate D⁴ representing the design on the face of the stone. If desired, the parts may be in a position shown in Fig. 7 and the better quality material used for the face of the stone may be placed into the recess of the pattern-plate D⁴ and spread upon this plate. Then the mold-box is swung from right to left upon this pattern-plate and into the position shown in Fig. 1. The face part of the block may be filled in and tamped by the first and second methods just described. The mold-box is partly filled with a composition for making the block and is tamped, and then the cores M and N are passed through the holes M' and N' in the plate L and their centering-pins Q are guided into the holes q in the side plate K, whereby these cores are properly centered and held in place. The balance of the material is then filled into the mold-box and carefully tamped in the usual manner until the entire box is filled, and then the material is scraped off at the top level with the top edges of the sides and ends of the mold-box. The crank-handle E⁵ is now turned in the direction indicated by the arrow X in Fig. 1, and as the mutilated part of the pinion E' is at the rim of the gear-wheel E this wheel is not turned and remains at rest, and consequently the mold-box also remains at rest in the position shown in Fig. 1; but by thus turning the crank-handle the tappet or arm E³ is moved upward on an arc until it strikes against the pin E⁴ on the wheel E. By this movement of the crank-handle the shaft E² has been turned to such an extent that the cams F³ are moved from the position shown in Fig. 3 into the position shown in Fig. 4, whereby the supports F' are permitted to descend under the action of the weight of the pattern-plate D⁴ and at the same time are forced down by the lower projecting arms of the cams, and thereby the pattern-plate is lowered and moved out of the opening in the base C of the mold-box, so that the top of this pattern-plate is moved below the greatest projection of the ornamental face of the molded block. By this time the tappet E³ by acting on the pin E⁴ starts the rotation of the wheel E³ and shaft E⁶, and at the same time the teeth of the pinion E' engage the teeth of the cog-wheel E, and this cog-wheel is rotated, and thereby the mold-box is swung from the position shown in Fig. 1 into the position shown in Fig. 7, the outer face of the plate L now resting upon the table B, which is now in raised position.

The projecting hooks P of the cores pass through one of the slots B⁴ in the table B, and by shifting the lever B' it is engaged with the lower projecting ends of these hooks P and the cores are locked to the table. The end plates or boards H of the mold must be now moved outward for the purpose of withdrawing the half-cores h' from the block sufficiently for entirely clearing the block, and this is accomplished by turning the hand-wheels H³. The table B is now moved downward slowly by turning the crank-handle A⁴, and thereby the cores are lowered, as is also the entire block, with the plate L, until said plate L rests upon the rollers R or R', as shown, for example, in Fig. 7. Such movement of this plate L is possible because the pins L' on the bottom edge of this plate are within the slots C³ of the base of the core-box. The entire block has now been lowered to such an extent that it clears the ridges $a'$ in the plate K, and thus can be moved horizontally—that is, to the right, Fig. 7—out of the mold-box with the plate L, which still forms a support for the block and remains engaged with the block by means of the bottom ridges $b'$ of the plate L.

Fig. 7 shows how the block has been moved laterally—that is, horizontally—on the rollers, whereupon the handles L² of this plate L can be grasped by workmen and the entire block can be carried away upon this plate to a proper place for curing, setting, and temporary hardening.

Having described my invention, what I claim as new, and desire to secure by Letters Patent, is—

1. In a machine for molding blocks, the combination with a pivoted molding-box, of a removable bottom pattern-plate, means for tilting said box and means for lowering said pattern-plate out of the box, substantially as set forth.

2. In a machine for molding building-blocks, the combination with a pivoted molding-box, of a removable bottom pattern-plate in said mold-box, and means for successively lowering said pattern-plate and then tilting the mold-box, substantially as set forth.

3. In a machine for molding building-blocks, the combination with a pivoted mold-box and a vertically-movable pattern-plate in the bottom of said box, of a rotative shaft, and means on the same for raising and lowering said pattern-plate, substantially as set forth.

4. In a machine for molding building-blocks, the combination with a pivoted mold-box, and a pattern-plate in the bottom of said box and movable toward and from the bottom edges of the box, of a rotative shaft and means operated from said shaft for tilting the box, substantially as set forth.

5. In a machine for molding building-blocks, the combination with a pivoted mold-box and a vertically-movable pattern-plate in the bottom of said box, of vertically-movable supports for said pattern-plate, a rotative shaft and cams on said shaft for raising and lowering said supports, substantially as set forth.

6. In a machine for molding building-blocks, the combination with a pivoted mold-box and a vertically-movable pattern-plate, in the bottom of said box and movable supports for said pattern-plate, of a rotative shaft, cams on said shaft for raising and lowering said supports, and means driven from said shaft for tilting the box, substantially as set forth.

7. In a machine for molding building-blocks, the combination with a mold-box base having a series of holes in one side member and a series of transverse slots in the other side member, of side walls having bottom projections entering said holes and slots the bottom projections extending into said slots being movable lengthwise of the slots, substantially as set forth.

8. In a machine for molding building-blocks, the combination with a mold-box base having rigid ends, of movable box-end pieces, pins projecting from the rigid ends and passing loosely through the movable end pieces, substantially as set forth.

9. In a machine for molding building-blocks, the combination with a mold-box base having rigid ends, of movable box-end pieces and screws mounted in the rigid ends and engaging the movable ends, substantially as set forth.

10. In a machine for molding building-blocks, the combination with a base-frame having transverse slots in one longitudinal member, of a side wall having bottom projections extending freely through said slots, the said projections being movable in said slots lengthwise of said slots, substantially as set forth.

11. In a machine for molding building-blocks, the combination with a mold-box base-frame, having rigid ends, of box ends movable toward and from the rigid ends, a fixed side wall and a movable side wall, the latter mounted and guided on said base-frame to move slidably on edge toward and from the fixed side wall and while so moving remaining parallel with said fixed side wall, substantially as set forth.

12. In a machine for molding building-blocks, the combination with a frame, of a mold-box pivoted along one angle to swing on said frame, and a vertically-movable table in said frame, substantially as set forth.

13. In a machine for molding building-blocks, the combination with a frame, of a mold-box pivoted along one angle to swing on said frame, a vertically-movable table in said frame, cores, and means for locking said cores to the table, substantially as set forth.

14. In a machine for molding building-blocks, the combination with a frame, of a mold-box pivoted along one angle to swing on said frame, a vertically-movable table in said frame, which table has an opening, cores having projections which can extend through said table, and a core-engaging means on said table, substantially as set forth.

15. In a machine for molding building-blocks, the combination with a frame, of a mold-box pivoted along one angle to swing on said frame, a vertically-movable table in said frame, which table has an opening, cores having hooks which can extend through said opening and a hook-engaging means on said table, substantially as set forth.

16. In a machine for molding building-blocks, the combination with a supporting-frame, of a tilting core-box mounted on said frame and having a removable side wall, a vertically-movable table in said frame and rollers mounted in the top of said frame at the sides of the table, substantially as set forth.

17. In a machine for molding building-blocks, the combination with a base-plate, of a removable pattern-plate in the same, a mold-box on said base-plate formed of two longitudinal side plates and two end walls, one of the side plates being fixed on the base and the other movable on said base on edge toward and from one longitudinal plate, the fixed plate having a longitudinal ridge on its inner surface and the other side wall having a longitudinal groove in its inner face, substantially as set forth.

18. In a machine for molding building-blocks, the combination with a base-frame, of a mold-box on the same formed of a fixed side plate, and a movable side plate, the movable side plate being movable on edge on said base toward and from the fixed side plate, and end plates movable on said base, on edge toward and from the ends of the side plates, the fixed side plate having a longitudinal ridge on its inner surface and one of the end plates having a ridge on its inner surface and the other end plate having a groove on its surface, substantially as set forth.

In testimony whereof I have signed my name to this specification in the presence of two subscribing witnesses.

JULIUS JAEGER.

Witnesses:
S. F. JEAGER,
H. G. BELL.